(12) United States Patent
Wallman

(10) Patent No.: US 6,338,047 B1
(45) Date of Patent: Jan. 8, 2002

(54) METHOD AND SYSTEM FOR INVESTING IN A GROUP OF INVESTMENTS THAT ARE SELECTED BASED ON THE AGGREGATED, INDIVIDUAL PREFERENCE OF PLURAL INVESTORS

(75) Inventor: Steven M. H. Wallman, Great Falls, VA (US)

(73) Assignee: FOLIOfn, Inc., Vienna, VA (US)

(*) Notice: Subject to any disclaimer, the term of this patent is extended or adjusted under 35 U.S.C. 154(b) by 0 days.

(21) Appl. No.: 09/339,299

(22) Filed: Jun. 24, 1999

(51) Int. Cl.[7] .......................... G06F 17/60; G06F 15/30
(52) U.S. Cl. ...................................................... 705/36
(58) Field of Search ...................... 705/36, 37; 364/408

(56) References Cited

U.S. PATENT DOCUMENTS

| | | | |
|---|---|---|---|
| 4,346,442 A | 8/1982 | Musmanno | 364/408 |
| 4,376,978 A | 3/1983 | Musmanno | 364/408 |
| 4,566,066 A | 1/1986 | Towers | 364/408 |
| 4,597,046 A | 6/1986 | Musmanno et al. | 364/408 |
| 4,642,768 A | 2/1987 | Roberts | 364/408 |
| 4,648,038 A | 3/1987 | Roberts et al. | 364/408 |
| 4,674,044 A | 6/1987 | Kalmus et al. | 364/408 |
| 4,750,121 A | 6/1988 | Halley et al. | 364/408 |
| 4,751,640 A | 6/1988 | Lucas et al. | 364/408 |
| 4,774,663 A | 9/1988 | Musmanno et al. | 364/408 |
| 4,910,676 A | 3/1990 | Alldredge | 364/408 |
| 4,933,842 A | 6/1990 | Durbin et al. | 364/408 |
| 4,953,085 A | 8/1990 | Atkins | 364/408 |
| 4,980,826 A | 12/1990 | Wagner | 364/408 |
| 4,989,141 A | 1/1991 | Lyons et al. | 364/408 |
| 4,994,964 A | 2/1991 | Wolfberg et al. | 364/408 |
| 5,038,284 A | 8/1991 | Kramer | 364/408 |
| 5,101,353 A | 3/1992 | Lupien et al. | 364/408 |
| 5,126,936 A | 6/1992 | Champion et al. | 364/408 |

(List continued on next page.)

FOREIGN PATENT DOCUMENTS

| | | | |
|---|---|---|---|
| EP | WO 98/44443 | 10/1998 | |
| EP | WO 98/44444 | 10/1998 | |
| EP | WO 99/28845 | 6/1999 | |
| WO | 00/14664 | * 3/2000 | ........... G07F/17/60 |
| WO | 00/79363 | * 12/2000 | |

OTHER PUBLICATIONS

Business Line Nov. 7, 1998–Notepad.*
Business Wire–Oct. 2, 1998–"Tech Stock Bargains".*
Robert Barker, A Capital–Gains Miracle Worker, Business Week, Jan. 31, 2000, p. 130.
Anne Tergesen, Here Come the E–Funds, Business Week, Jan. 31, 2000, p. 125.

*Primary Examiner*—Robert W. Downs
*Assistant Examiner*—Geoffrey Akers
(74) *Attorney, Agent, or Firm*—Kenyon & Kenyon (57) ABSTRACT

A system and method for allowing a plurality of investors to manage investments in a mutual fund or a directly-owned portfolio of investments. The assets and liabilities of the mutual fund are adjusted in response to an action (buy, sell, trade) by one of the fund's members or participating investors in the system. A determination is then made of that member's and the other fund members' pro rata ownership interest, based on the economic result of that action. This process is iterated, as necessary, in response to actions taken by any members of the mutual fund. In this way, the mutual fund is dynamically managed. For a portfolio directly-owned by an investor participating in the system, the portfolio would be dynamically managed by having it reflect the dynamically changing individual, and aggregated, actions of other participating members, or others. This investing system provides the first opportunity for investors to invest in a dynamically changing fund or to have a dynamically changing portfolio that is actively managed not by a professional manager but by the constantly changing, aggregated but individual (as opposed to collectively acted upon) preferences of an unlimited plurality of investors.

97 Claims, 5 Drawing Sheets

U.S. PATENT DOCUMENTS

| | | | |
|---|---|---|---|
| 5,132,899 A | 7/1992 | Fox | 364/408 |
| 5,148,365 A | 9/1992 | Dembo | 364/402 |
| 5,193,056 A | 3/1993 | Boes | 364/408 |
| 5,202,827 A | 4/1993 | Sober | 374/408 |
| 5,210,687 A | 5/1993 | Wolfberg et al. | 364/408 |
| 5,214,579 A | 5/1993 | Wolfberg et al. | 364/408 |
| 5,220,500 A | 6/1993 | Baird et al. | 364/408 |
| 5,227,967 A | 7/1993 | Balley | 364/408 |
| 5,262,942 A | 11/1993 | Earle | 364/408 |
| 5,270,922 A | 12/1993 | Higgins | 364/408 |
| 5,297,032 A | 3/1994 | Trojan et al. | 364/408 |
| 5,375,055 A | 12/1994 | Togher et al. | 364/408 |
| 5,497,317 A | 3/1996 | Hawkins et al. | 364/408 |
| 5,517,406 A | 5/1996 | Harris et al. | 364/408 |
| 5,649,116 A | 7/1997 | McCoy et al. | 395/238 |
| 5,664,115 A | 9/1997 | Fraser | 705/37 |
| 5,671,363 A | 9/1997 | Cristofich et al. | 395/237 |
| 5,689,650 A | 11/1997 | McClelland et al. | 395/236 |
| 5,704,045 A | 12/1997 | King et al. | 395/235 |
| 5,710,889 A | 1/1998 | Clark et al. | 395/244 |
| 5,724,524 A | 3/1998 | Hunt et al. | 395/237 |
| 5,729,700 A | 3/1998 | Meinikoff | 395/236 |
| 5,745,706 A | 4/1998 | Wolfberg et al. | 395/235 |
| 5,749,077 A | 5/1998 | Campbell | 705/36 |
| 5,758,097 A | 5/1998 | Debe et al. | 395/235 |
| 5,761,441 A | 6/1998 | Bennett | 395/235 |
| 5,761,442 A | 6/1998 | Barr et al. | 395/236 |
| 5,765,141 A | 6/1998 | Spector | 705/14 |
| 5,774,881 A | 6/1998 | Friend et al. | 705/36 |
| 5,784,696 A | 7/1998 | Meinikoff | 705/36 |
| 5,794,219 A | 8/1998 | Brown | 705/37 |
| 5,799,287 A | 8/1998 | Dembo | 705/36 |
| 5,806,047 A | 9/1998 | Hackel et al. | 705/36 |
| 5,806,049 A | 9/1998 | Petruzzi | 705/36 |
| 5,812,987 A | 9/1998 | Luskin et al. | 705/36 |
| 5,918,218 A | 6/1999 | Harris et al. | 705/37 |
| 5,930,774 A | 7/1999 | Chennault | 705/36 |
| 5,946,666 A | 8/1999 | Nevo et al. | 705/36 |
| 5,978,778 A | 11/1999 | O'Shaughnessy | 705/36 |

\* cited by examiner

METHOD AND SYSTEM FOR INVESTING IN A GROUP OF INVESTMENTS THAT ARE SELECTED BASED ON THE AGGREGATED, INDIVIDUAL PREFERENCE OF PLURAL INVESTORS

RELATED APPLICATIONS

The present invention is related to U.S. patent application No. 09/038,158 entitled "Method and Apparatus for Enabling Smaller Investors or Others to Create and Manage a Portfolio of Securities or Other Assets or Liabilities on a Cost Effective Basis" filed on Mar. 11, 1998. The present invention is also related to U.S. patent application Ser. No. 09/139,020 entitled "Method and Apparatus for Enabling Smaller Investors or Others to Create and Manage a Portfolio of Securities or Other Assets or Liabilities on a Cost Effective Basis" filed on Aug. 24, 1998. Both of these applications were filed by the inventor of the present invention. U.S. patent application Ser. Nos. 09/038,158 and 09/139,020 are both incorporated herein by reference in their entirety, including the drawings.

BACKGROUND OF THE INVENTION

1. Field of the Invention

The present invention relates generally to methods and systems for creating a collection of securities for investment purposes. More specifically, the present invention relates to creation of a fund, including, but not limited to, specifically a registered open-end investment company (a "mutual fund"), or a portfolio of directly-owned securities owned by an investor or a group of investors (such as an investment club) or managed by an adviser, where the preferences of the fund's or portfolio's own shareholders, or the participating investors, are utilized in selecting the securities and the portfolios of investments to be owned by the fund or to be included in the portfolio.

2. Background Art

Currently, investors have a few basic choices in terms of investing their money. They can manage their money themselves, or they can have someone else manage it for them. If they manage it themselves, they can obtain information from a variety of sources, including financial planners and advisers, brokers, and printed, on-line, or other materials. These sources allow investors managing their own money to do so with more or less specific information and advice provided to them. By investing in this manner, an investor retains the discretion to accept or reject the advice, and the investor makes the final investment decision.

In contrast, an investor can have someone else manage the investor's money for the investor, either by providing discretionary authority to a money manager or broker in an individual brokerage or other account managed for a specific investor, or by investing in a vehicle such as a mutual fund, a hedge fund, or some other collective investment vehicle.

An investor who is a member of an investment club can have her investments managed in part by collective action by the members of the club where the members vote for the stocks to be purchased by the club. Those member actions are undertaken usually in meetings of the club, or occasionally on-line through e-mail or otherwise. They involve the collective selection of an investment, as opposed to the selection of investments that reflect aggregated, individual actions, even though, once selected, the investments, in both cases are held in a collective investment vehicle for all the investors. Put another way, in a typical managed mutual fund, investments are selected by a single or few money managers who determine the investments for all investors in the fund; in an investment club investments are selected by the collective action (such as by voting or by designating a manager) of the relatively few members of the club, and investors must become members of the club by collective action.

The above-mentioned related patent applications describe inventions that allow smaller investors, through the alternative of a direct stock ownership system, to create portfolios that uniquely provide both the advantages of a mutual fund and of direct stock ownership. Using those inventions, a smaller investor can provide discretion to another, such as a financial planner or a money manager, to create and manage a portfolio of stocks for the smaller investor that is directly-owned by the investor. In that way, the smaller investor can obtain the benefits of "active management"—the benefits of having a professional manager make investment decisions to select the securities to be held in an investor's portfolio—while also maintaining the benefits of direct stock ownership.

The benefits of active management are generally among the benefits that many investors seek in an actively managed mutual fund where a professional fund manager—the fund adviser—makes the active investment decisions for the fund as a whole. A smaller investor can also use the inventions described in the related applications to track a securities index, or an industry sector, using various selection criteria, thereby mimicking passively managed mutual funds like index funds. The above-mentioned related applications also describe a collaborative filtering technique that assists in the selection of securities to be included in the investor's portfolio by allowing investors to choose to follow the selections of a selected group of investors. The above-mentioned related applications also describe a means to create a portfolio for smaller investors that is limited by or satisfies certain parameters, such as minimum diversification and maximum security issue concentration, so as to be useful as a substitute in 401(k) or similar plans.

A frequently noted problem with actively-managed funds or professionally managed accounts is the so-called "herd" phenomenon. Professional managers of a mutual fund usually have styles, or the fund frequently has a "style". For example, a fund could be a "growth" fund, seeking to invest in high growth stocks. Another fund may be an income fund, seeking to invest in high dividend stocks. When a stock is viewed as "growth," the growth funds buy it, and similarly for other stocks and funds. Moreover, general trends in the economy are all followed by the same information sources, which report the same events and provide distribution means to the same commentators. Consequently, many professional managers hear and listen to the same things.

In addition, because many money managers are graded and reviewed based on how well they do relative to their peers, there is a tendency not to make investment choices that will be contrary to the decisions that one's peers will be making. It is better to try to be just slightly—but consistently—above average, than to run the risk of being a loser while trying to be a star. For these and other reasons, there is an observed phenomenon where the "smart" money follows the same investments, makes the same decisions, including the same mistakes, and usually performs less well, net of costs, on average than the market as a whole. The result is poorer performance from professionally-managed, actively-managed mutual funds than might otherwise be expected.

Under currently available offerings and the current art, an investor who does not wish to make his or her own investment decisions (or provide discretion to a broker or a money manager for an individualized account) can, very generally, either select to invest in a variety of passively-managed index funds or unit trusts, or select to invest in actively-managed mutual funds where the active management is supplied by a professional fund adviser. There is no way, however, for an investor to have a dynamic and changing actively-managed portfolio that reflects the aggregated, but individual, preferences of a plurality of investors, such as hundreds, thousands or millions of other people, and both as to the stocks in the portfolio and the proportion or weighting of the stocks in the portfolio.

Investing in an index fund is not the same. An index fund, like the S&P500 funds, invest in the "market" or some index and the fund increases or decreases in value depending on whether the "market" or the selected index rises or falls. At best, these funds reflect the investing public's preferences only to the degree the public's preferences are reflected in the upwards or downwards price of the specific stocks in the index and, therefore, in the fund—the investing public's preferences as to what should be held in the fund are irrelevant. An index fund does not vary in its weightings (except as the relative capitalization of the stocks themselves may change) or holdings (except when the index itself changes), and the holdings and the method of determining the weightings are dictated by those who specify the index (such as Standard & Poors, a division of McGraw Hill, for the S&P 500 funds). Even a fund that holds all of the stocks that are publicly traded will not have the weightings in the fund dictated by the preferences of investors, but by whether the stocks in the fund with the specific weightings chosen for the fund are increasing or decreasing in value.

Thus, the prior art does not provide for a fund that reflects the aggregated, individual preferences of a plurality of investors, and that varies its holdings and weightings to reflect changes in those preferences. Investors do not have the opportunity to invest in a dynamically-changing fund that is actively managed by the constantly and dynamically changing preferences of a plurality of investors, rather than by a professional manager. Similarly, investors who want their own portfolio (or a portfolio managed by another or held in an investment club) to be managed to reflect the constantly and dynamically changing individual, aggregated preferences of a plurality of investors, do not have any means to do so.

What is needed is a way for individuals to invest so that they can avail themselves of the advantages (e.g., economies of scale, active management) of a mutual fund without being subjected to the attendant disadvantages. What is needed is a way for an investor to invest in a mutual find, or to have his or her own portfolio modified in a manner, that is actively managed by the constantly and dynamically changing individual preferences of a plurality of investors, rather than by a professional manager.

SUMMARY OF THE INVENTION

It is an object of the present invention to provide investment methods and systems that avoid the above-described problems.

It is a further object of the present invention to provide a vehicle for an unlimited number of investors to interact with an unlimited number of other investors and create a "people's" mutual fund reflecting the interests and preferences of thousands or millions of different persons.

Yet another object of the present invention is to provide the first opportunity for investors to invest in a dynamically-changing fund that is actively managed not by a professional manager but by the constantly and dynamically changing preferences of thousands or millions of investors. The result may well be a fund that outperforms the professional managers, and the popular indices (i.e., the "market").

A mutual fund according to the present invention, because it reflects the aggregate preferences of thousands or millions of individual investors, may or may not be diversified and may be heavily weighted in one sector or another. In any event, the fund will vary in its holdings and weightings as new preferences are reflected in the fund. Such a fund could, conceivably, have all or most of its investment in just one sector or a handful of stocks at one point in time, then be invested in hundreds or thousands of stocks at a different point in time, and then revert to just a few stocks held in the portfolio.

To carry forward the above objects, a method according to the present invention is used to dynamically manage a mutual fund , the mutual fund having assets and liabilities that are collectively owned by plural members. This method embodiment would include adjusting the assets and liabilities of the mutual fund in response to an action (buy, sell, trade, etc.) by one of the fund's members. A determination is then made of that member's pro rata ownership interest, based on the economic result of the action. A determination is also made of the other fund member's pro rata ownership interests, based on the economic result of the action. This process is iterated, as necessary, in response to actions taken by any members of the mutual fund. In this way, the mutual fund is dynamically managed.

The present invention is alternatively embodied as a method that is useful in managing a portfolio of investments held directly by an investor. Securities are selected to be included in the portfolio according to the aggregate investment choices of a group of investors in a collaborative system where the selections reflect the aggregated, but individual, choices of the participating investors. The composition of what securities are included in the portfolio is modified, so as to reflect changes in the aggregate investment choices of the collaborative group of investors.

Another way to carry forward the above objects of the invention is to embody the present invention as a method of calculating numeric results for use in dynamically managing a mutual fund, the mutual fund having assets and liabilities that are collectively owned by plural members but that are selected in accordance with the aggregated, but individual, choices of the participating investors. One calculation performed in this method is to calculate an adjustment of the assets and liabilities of the mutual fund in response to an action of one of the fund's members. The method also calculates the pro rata ownership interest of that member, based on the economic result of the action taken. A calculation is also made of the pro rata ownership interest of the remaining fund members, based on the economic result of the action. These calculations are repeated, as necessary, when fund members take additional actions with respect to the fund's assets and liabilities. The numeric results of these calculations constitute products that are useful to enable dynamic management of the mutual fund.

Yet another way to carry forward the above objects of the invention is to embody the present invention as a computer system that implements any of the above-described methods.

Still another way to carry forward the above objects of the invention is to embody the present invention as a computer program product that bears instructions for effecting any of the above-described methods.

A further way to carry forward the above objects of the invention is to embody the present invention as a computer system that includes an input/output portion for manipulating the assets and liabilities of a mutual fund in response to an action by a member of the mutual fund. The system further includes an arithmetic logic unit for determining the pro rata ownership interest of the member taking action, as well as the pro rata ownership interest of the other members of the fund. The system also has a processor for controlling the input/output portion and the arithmetic logic unit to repeat the above functions as necessary, based on the actions by members of the fund. In this way the fund is dynamically managed.

Beyond overcoming the above-noted deficiencies of the prior art, the present invention also provides an added advantage of reduced management costs for its mutual fund. The investors in a mutual fund managed according to the present invention obtain the advantages of active management without the need to pay professional fund managers. The management is a computer system. Thus, the cost of running a fund according to the present invention is so reduced as to approach that of an index fund.

In the system of the present invention, investments are included based on the individual action and selection of each member acting on his or her own, with no collective action, where the aggregation of these individual actions reflects the overall investment in the portfolio. Moreover, the participants in the portfolio are self-selected or are participants that satisfy certain criteria, but they are not required to be admitted by collective action—anyone can join or exit at anytime. In contrast to the present invention, investors in an investment club select investments for the club through collective action, such as voting, or by delegation to one or more individuals of investment decision-making. Although the present invention could also be utilized in the context of a voting mechanism, its preferred embodiment does not use collective voting action, but actual aggregated, individual investor action, to determine the investments to be held. The alternative embodiment of the present invention in the context of a voting mechanism differs from an investment club using the Internet or other means to create an electronic mechanism.

In addition, the investors in such a fund could be self-selected upon advertisement of the fund's availability, or selected because of their membership in some affinity group such as a professional or other organization, or selected based on certain criteria, such as employment in a certain industry or company or having a certain net worth, or self-selected upon advertisement of a fund's availability with certain stated objectives such as attracting investors interested in high technology stocks, or some specific investment approach. The invention works equally well for general availability funds as it does for selected availability funds.

BRIEF DESCRIPTION OF THE DRAWINGS

The present invention will be best understood by reading the following detailed description in conjunction with the attached drawing figures, in which.

DETAILED DESCRIPTION OF THE INVENTION

The below described preferred embodiment is a computer system implementing a method that permits investors to invest in a fund that reflects the preferences of a multitude of investors. Investors could also invest through another embodiment of the present invention where the investment vehicle is a directly owned portfolio of investments, as further described below. The fund method is described as follows.

First, a fund would be established. For tax and regulatory purposes, this fund would, most likely, be a regulated "mutual fund" with the attendant attributes, including the disadvantages, of such a fund as described in the related patent applications (cited above).

Figure 3:
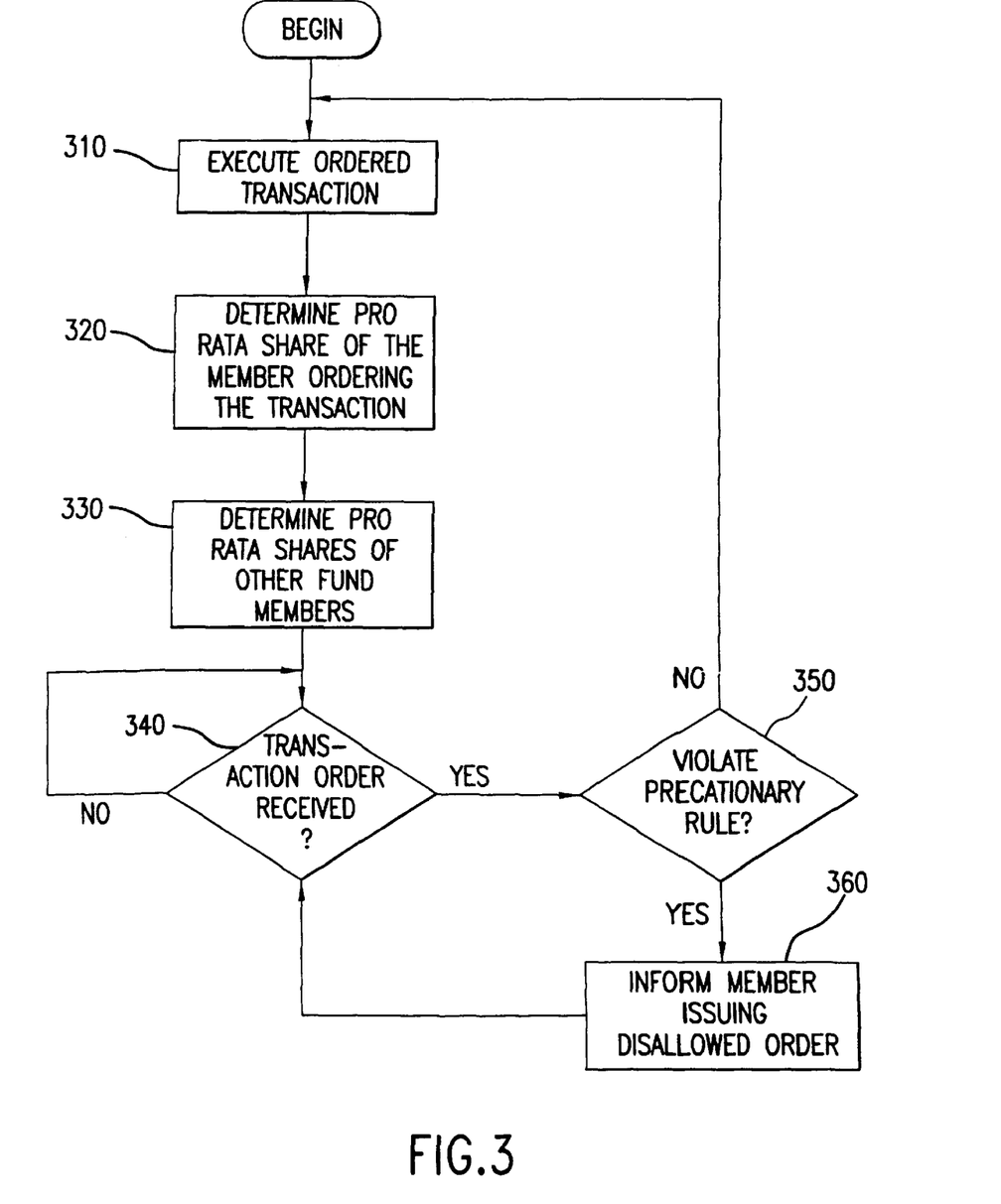
FIG. 3 illustrates a flow chart of a method according to the preferred embodiment of the present invention.

An investor would contribute to the fund either securities or, more likely, cash. If securities are contributed, they would be valued at the time of contribution at fair market value. Cash would, of course, be valued at fair market value equal to face value. If securities were provided, they would be added to the fund and the investor would receive a pro rata interest in the fund in a manner described below. If cash were contributed, the investor would receive a pro rata interest in the fund, and the investor would then designate which securities the cash would be used to purchase, with certain limitations. Some limitations may be imposed so as to preclude gamesmanship and manipulation (see FIG. 3 at 350, 360). For example, one useful limitation is to bar an investor from ordering the fund to buy stock in any company in which that investor is an officer or in which that investor holds an option. Another useful limitation is to bar any investor from purchasing penny stocks or other stocks where the average daily trading volume (ADTV) is low, if the investor's order would be likely to impact the price of those stocks. In addition, in order to ensure that no one investor's preferences can dominate the fund, the fund could put aggregate limits on the amount that an investor could contribute to the fund at one time or over a specified period or in relation to the overall size of the fund.

If there is no allocation designated by the investor, the cash could be allocated to purchase pro rata the existing stocks in the fund (i.e., to mirror past selections of the other investors), or to purchase more of the most recently purchased stocks, or the stocks most frequently purchased, or some other default allocation rule. Other allocation rules that are useful are: to purchase stocks that fall within a certain economic segment (e.g., tech stocks, utilities), or to purchase stocks that are contra to current vogue, or to achieve particular tax results (e.g., averaging of tax lots). In the event that an allocation is designated by the investor, stocks may be purchased with the contributed cash based on a formula or a set of predetermined allocation rules, such as those described above.

The pro rata ownership interest of an investor making his first contribution to the fund is calculated by summing the total fair market value of the fund at the time of the contribution by the investor with the amount of the investor's contribution, and then dividing that sum into the amount of the investor's contribution.

As an example, if a fund currently has a total fair market value of $990,000, then an investor who contributed $10,000, whether in cash or in stocks, would receive a 1% interest in the fund.

$$\$10,000/(\$990,000+\$10,000)=1\%$$

A generalized formula for determining ownership share for an investor making contributions, both initial and subsequent is $$I_{NEW}=((I_{OLD}\cdot T_{OLD})+V_{CONTRIBUTION})/T_{NEW} \quad (1)$$

where $I_{NEW}$ is the pro rata ownership interest of the contributing investor, after making the contribution, and $I_{OLD}$ is the contributing investors pro rata ownership interest, prior to the contribution (i.e., zero in the case of a first-time contributor). $T_{NEW}$ is the total value of the mutual fund after the contribution, $T_{OLD}$ is the total value of the mutual fund prior to the contribution, and $V_{CONTRIBUTION}$ is the fair market value of the contribution. Of course, formula (1) may be stated otherwise as $$I_{NEW}=((I_{OLD}\cdot T_{OLD})+V_{CONTRIBUTION})/(T_{OLD}+V_{CONTRIBUTION}) \quad (2)$$

since $T_{NEW}=T_{OLD}+V_{CONTRIBUTION}$. This formula works also for withdrawals from the fund, in which case $V_{CONTRIBUTION}$ has a negative value.

A convenient mechanism for providing that "pro rata interest" to the investor would be to establish a net asset value each day (or on some other selected period less than or greater than one day) and then have the investor "buy" an interest in the fund at that price for his contribution. Such a mechanism is typically used in an open-end mutual fund.

Other investors would similarly contribute and designate. Over time, the fund would reflect the interests of the investors that invest in the fund. That may mean that the fund is overly weighted in particular categories or stocks, it may mean that the entire fund is in one sector, or it may mean that the fund looks very much like the S&P 500 or some other index. The beauty is that it can consistently change as individual preferences change, and the preferences that the fund reflects are not those of professional money managers, but of the investing public participating in the fund. The more an investor puts in the fund, the more that investor's preferences are reflected, but as the fund grows it will obtain the increasing benefits of more and more individual investors selecting stocks and expressing their preferences. Because investors actually have to put money or securities into the fund, they will not be expressing interests that they do not believe in.

Of course, a contribution (or withdrawal) by any member has an effect on the pro rata interests of the other members as well. A generalized formula for determining ownership share for investors not involved in a given transaction is $$I_{NEW}(n)=I_{OLD}(n)\cdot(T_{OLD}/T_{NEW})=(I_{OLD}(n)\cdot T_{OLD})/(T_{OLD}+V_{CONTRIBUTION}) \quad (3)$$

where $I_{NEW}$ (n) is the pro rata ownership interest (after the transaction) of the $n^{th}$ one of the members, and $I_{OLD}$ (n) is the pro rata ownership interest (before the transaction) of the $n^{th}$ one of the members.

Provision may also be made for any member investor to order that stock they previously purchased be swapped (traded) for another stock. A stock swap would result in no net change in the investor's pro rata ownership interest. For purposes of making the trade, the fund operator acts to sell a first designated stock (presumably previously purchased at the direction of the subject investor) for cash and then use the cash to effect a purchase of a second designated stock. This would be the economic equivalent potentially without adverse tax consequences—of an investor selling an interest in the find, obtaining cash, and then reinvesting the cash in the fund and designating a different security to be purchased.

Efficient operation of the fund is optimized when such swaps are kept to a minimum, however. Thus, to insure efficient operation of the fund, one or more mechanisms may be implemented to discourage excessive trading activity via the fund. For example, a fee would be assessed to any investor who orders more than a predetermined number of trades over a set time period (e.g., two per month). Another mechanism would be to simply limit each investor to no more than a predetermined number of trades over a set time period, or to preclude any swap of securities not held for some minimum time period (such as six months)

The fund could also maintain records of trades ordered by each investor so that the records can be provided to the investor for tax purposes, when that investor cashs out of the fund.

The fund may be limited in a number of ways. One optional limiting mechanism is to limit the fund's investment allocation to certain sectors or stocks that satisfy specified criteria as to liquidity or general popularity as determined by ADTV. Another optional limiting mechanism is to permit each investor to allocate only from a number of selected stocks that have been chosen by a professional manager. Other optional limiting mechanisms can also be incorporated.

Figure 1:
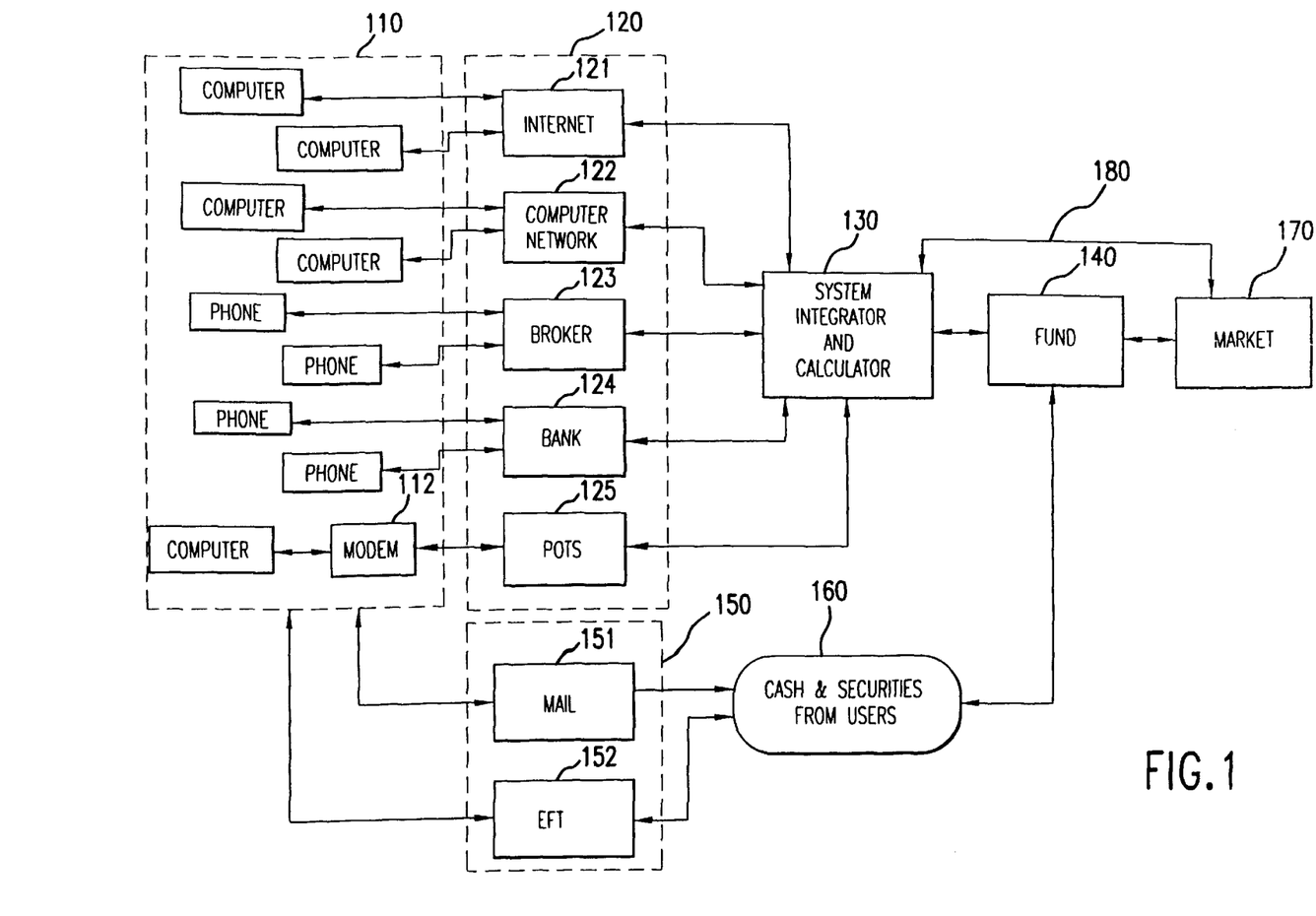
FIG. 1 illustrates, in block diagram format, a system that implements the present invention.

Referring to FIG. 1, users 110 access the computer-based system integrator and calculator 130 through an interface 120. The interface 120 includes a variety of communications systems, such as the Internet 121 or any other computer network 122. The interface 120 may be via a third party, such as a broker 123, bank 124, or other intermediary. A known communications device, such as direct dial-up modem 112 may be used to interface with the system integrator and calculator 130 via the plain old telephone system (POTS) 125, cable modem or other communications devices.

The fund 140 according to the preferred embodiment may be embodied as an account administered by a system operator. The system operator may be a bank, a broker or some other type of custodian that can hold the relevant assets and liabilities and create a mutual fund, unit trust, or other suitable collective investment vehicle. Alternatively, the fund 140 may be a separate legal entity that is linked with a system operator that functions as the custodian of the assets and liabilities.

The phrase "assets and liabilities" is a term of art that broadly refers to cash, investments (equity securities and/or debt securities), including foreign or domestic equities, options, warrants, bonds, notes, limited partnership interests, private placement securities or otherwise, or commodities, futures, bank loan syndication interests and novel assets or liabilities that are traded such as pollution rights (including global warming and air/water pollution rights) or insurance claim interests, or any other tradable assets or liabilities or combination thereof. The use of the conjunctive is merely customary and does not imply that both assets and liabilities are always necessarily held contemporaneously—it more accurately means assets and/or liabilities. When used herein "securities" should also be read as including other "assets and liabilities" that are not securities. Initial public stock offerings (IPOs) can also be offered via the fund administrator to the members of the fund.

The system is associated with a market 170, such as an exchange (e.g., the New York Stock Exchange) or a dealer network (such as the NASD) or as part of or through appropriate intermediaries that are part of the fund operation, or that also operate separately.

The users 110 would provide cash and/or securities 160 to the fund operation through a connection 150 such as the mails (e.g., a check or money order via U.S. mail or overnight courier) 151, an electronic funds transfer 152, or otherwise. A user's cash and/or securities should be on deposit at the fund operation prior to the execution of instructions (received via the interface 120) to the system integrator and calculator 130 as to how such amounts should be invested in the fund 140, or may be provided subsequently to the fund pursuant to a commitment of the user. The system integrator and calculator 130 accepts such instructions 340 (FIG. 3) and enters into the appropriate transaction 310 (FIG. 3) on behalf of the fund 140 through its connection 180 to the market 170. The system would work identically if the orders are received as "preferences" of the users transmitted to a manager 130, who would then execute trades reflecting such preferences for the fund.

The connection 180 represents any of a number of conventional interfaces that are available for automated securities trading. The system integrator and calculator 130 according to the present invention sends commands and receives information via such a conventional interface.

In this way, the fund 140 then acquires ownership over the securities being acquired and holds the securities for the investors in the fund, including the new investor. The investor (a user 110) is then informed through the interface 120 that the investor's instructed investment has been made and the investor is informed as to the amount of the fund's assets that the investor now owns. This information may optionally be quoted as a percentage (pro rata) of the fund, or as a dollar amount, or as a number of shares and fractional shares in the individual securities in the fund, or as a combination thereof. This operation is shown as step 320 in FIG. 3. After the pro rata shares for the remaining investors is determined (step 330), the cycle for that one investor's investment is now complete.

In addition to this basic information, according to an alternate embodiment the administrator provides each user/investor with additional information such as a detailed histogram of the fund's overall performance, performance over time of the investor's previous investments, as well as information regarding the investment decisions of other members of the fund.

Figure 2A:
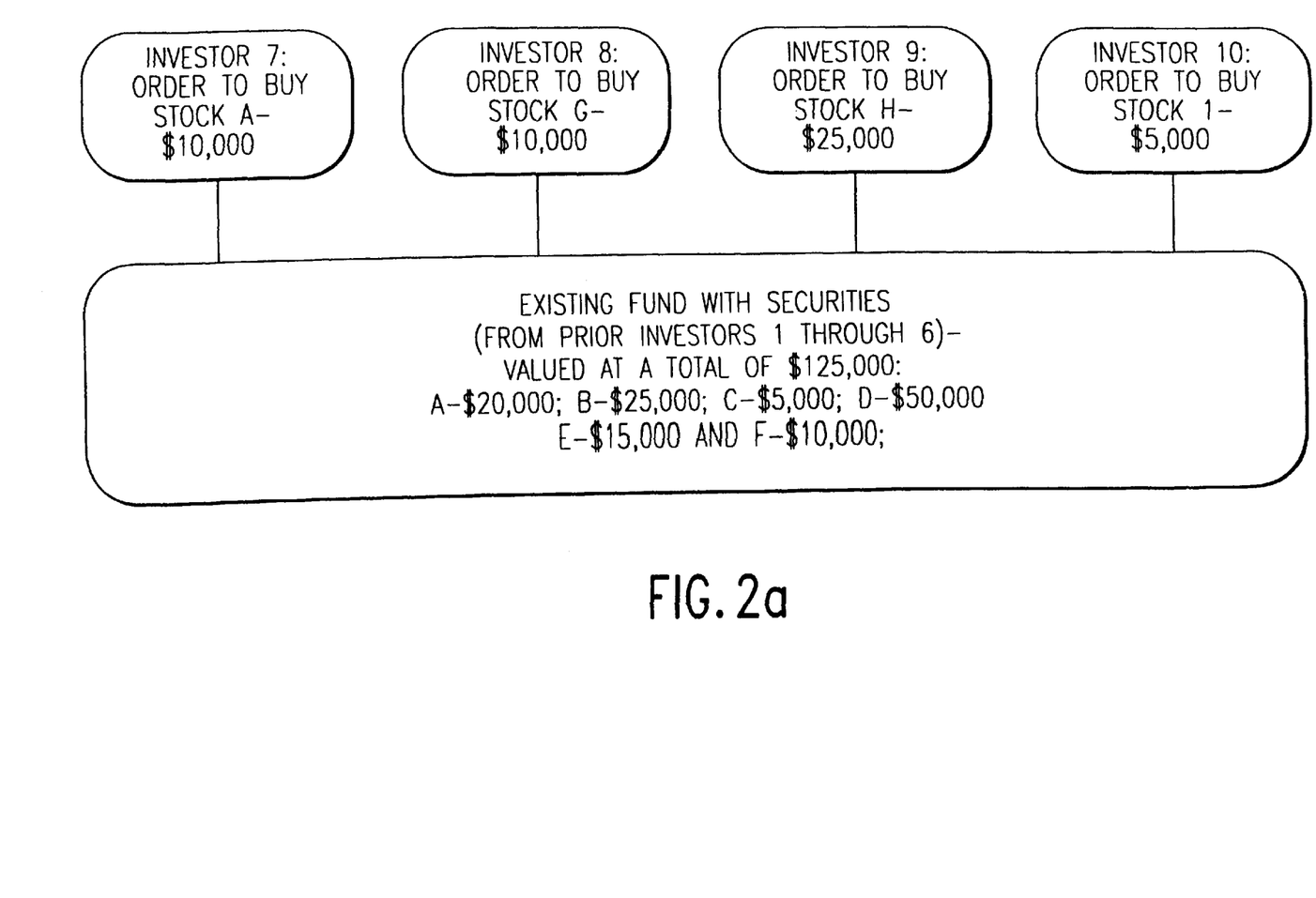
FIGS. 2a and 2b illustrate an example, in block diagram format, of how the present invention is useful to carry out orders for stock transactions via a batch approach.
Figure 2B:
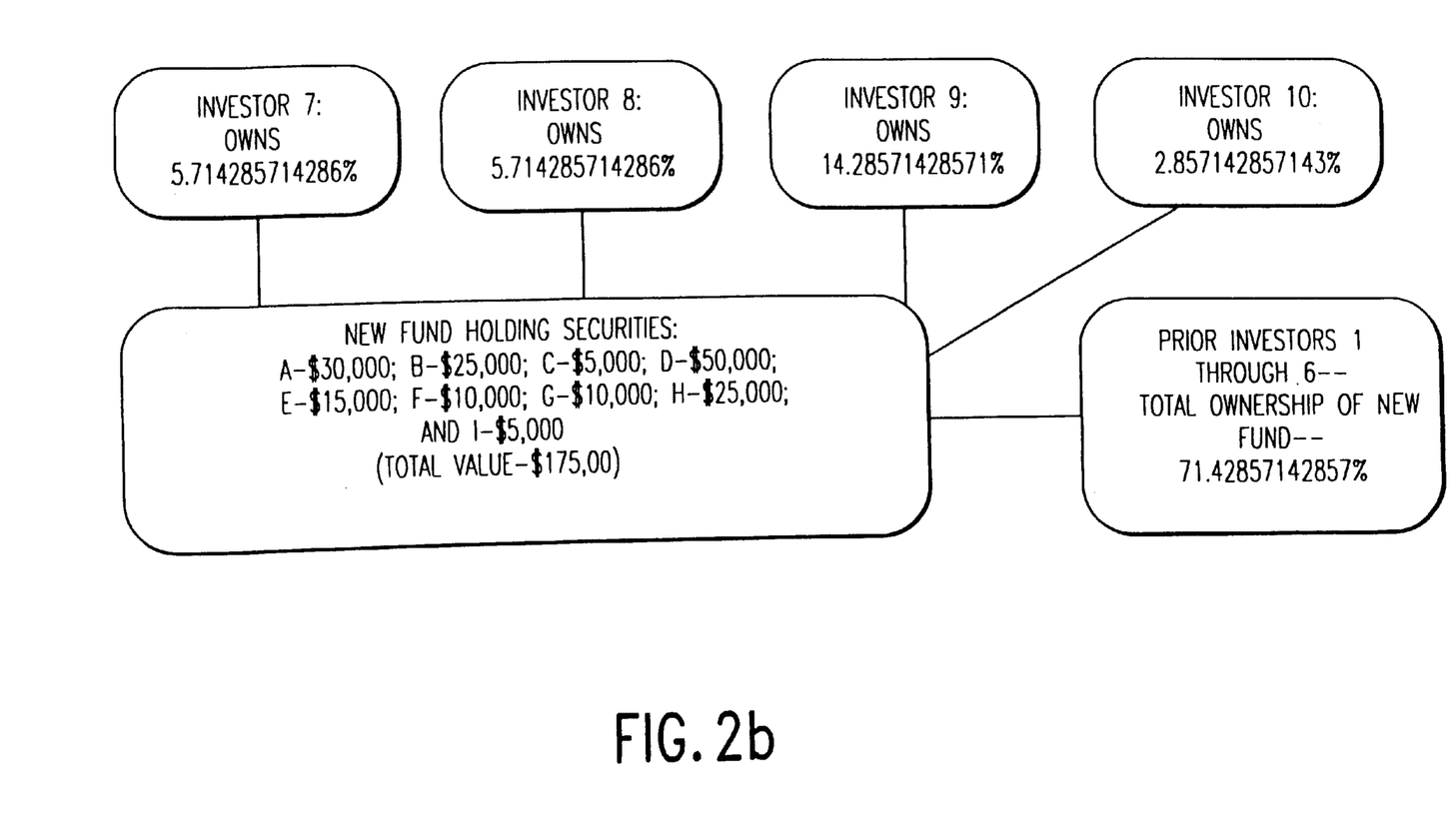

The above cycle is repeated and completed for any other investor who cares to join the fund or who wishes to add to, subtract from, or shift their position in the fund. According to one embodiment, such cycles are executed as the orders arrive. According to an alternate embodiment, such cycles are batched and completed as a batched, aggregated set of transactions, as illustrated in FIGS. 2a and 2b. Such batches of transactions are done once a day or more or less frequently, at the system operator's discretion, or as advertised, or as agreed with users. Batches may also be executed when a threshold amount of orders has been reached. The threshold amount may be measured in terms of volume of shares or in the dollar volume of the accumulated orders.

Fees for handling of stock purchases and sales are handled in a manner that is conventional and well known for mutual funds. For example, an asset-based fee may be utilized, or investors may pay a monthly fee or a signup fee when they join the fund.

FIG. 2a shows the status of the fund immediately prior to executing a batch of transactions. The fund holds stocks A ($20 k), B ($25 k), C ($5 k), D ($50 k), E ($15 k), and F ($10 k), which were purchased in the past at the behest of current member-investors nos. 1 through 6. New investor no. 7 has invested $10 k in the fund and ordered that $10 k of stock A be bought and added to the fund. New investor no. 8 has invested $10 k in the fund and ordered that $10 k of stock G be bought and added to the fund. New investor no. 9 has invested $25 k in the fund and ordered that $25 k of stock H be bought and added to the fund. New investor no. 10 has invested $5 k in the fund and ordered that $5 k of stock I be bought and added to the fund.

These instructions are executed and the result is illustrated in FIG. 2b. Immediately after the batched transactions, the fund holds $30 k worth of stock A, $25 k worth of stock B, $5 k worth of stock C, $50 k worth of stock D, $15 k worth of stock E, $10 k worth of stock F, $10 k worth of stock G, $25 k worth of stock H, $5 k worth of stock I. The pro rata ownership interests of the member-investors (or shareholders) is calculated as shown in FIG. 2b.

One feature of batch transactions is that conflicting orders are reduced to a net order, thereby reducing the number of shares of a given security that are traded. For example, consider the case where investor no. 23 and investor no. 51 submit contemporaneous orders, investor no. 23 ordering that 12 thousand shares of stock Q be sold and investor no. 51 ordering that 14 thousand shares of stock Q be bought. When the next batch transaction is performed, only the net result of these two conflicting orders is carried through by simply buying two thousand shares of stock Q. This rule avoids the result of the fund purchasing securities from itself.

For investors who have a "hands off" attitude about their investing, the fund has a feature whereby an investor issues a standing order that funds are to be transferred automatically from a personal account into the fund on a substantially regular (e.g., semi-monthly) basis. When the automatic transfers are made, the funds are invested according to a standing allocation order that the investor issues. Of course, the standing order can be modified at any time in the event the investor decides to shift his or her investment strategy. This feature is particularly useful for purposes of embodying the fund as a tax-deferred payroll deduction type of investment vehicle, i.e., for use with 401(k) plans or the like.

The system operator could be given some discretionary authority, such as in connection with sales of securities that would be effected to satisfy withdrawals from the fund or to maintain a cash balance on hand. Discretionary authority for the system operator would also be appropriate to effect a reweighting and reallocation in the event of extraordinary events, such as a distribution from an issuer with an election to accept securities or cash, or a takeover of an issuer.

The system operator could also establish rules, such as rules regarding what securities to sell when a sale is required to raise cash for the fund (e.g., to meet cash-out needs). One rule that may be adopted is the first-in-first-out (FIFO) rule so that the securities first acquired by the fund would be the securities first sold by the fund. Another sell rule could be to sell securities pro rata. Sales of securities could also be made with the intent of eliminating those that have not been selected to be purchased over a relevant time period so that the system operator is not selling securities that new investments are selecting to buy merely because those same securities had been selected to be bought earlier as well. The system operator could also sell those securities that comprise more than or less than a certain percentage interest in the fund so as to avoid gross over-weightings in a particular security, or to avoid dealing with small amounts of particular securities. The system operator could also sell securities to minimize taxes, or remain tax neutral or achieve other tax effects. The system operator could also allow the selling shareholder to designate the securities to be sold to satisfy the cash needs of the selling shareholder. Finally, the securities to be sold could be (some or all, depending on the relative value of those securities to the investor's interest of) the securities initially purchased at the previous selection of the selling shareholder, on the theory that since the shareholder is diminishing his or her ownership interest, his or her influence on the fund's composition should diminish accordingly.

Of course, when the selling shareholder sells some or all of its interests in the fund, the selling shareholder's percentage interest in the fund will be reduced correspondingly or eliminated. Cashing out of the fund would be handled by maintaining a cash reserve (such as 1% or 5% of the fund) for certain normal and expected cash withdrawals. For withdrawals that exceed the cash reserve, the fund would either sell securities according to one of the rules discussed above, or on some other basis that would be expected to reflect the interests of the participants.

As an alternative implementation means, an investor could modify his or her own portfolio to reflect the preferences of other investors by utilizing other inventions such as that described in U.S. patent application Ser. Nos. 09/038,158 and 09/139,020 as opposed to contributing to a public fund. For a very large number of investors and securities, such modification would include a great number of transactions with corresponding tax reporting and other issues, although it also provides a number of benefits, as is more fully described in such other related applications.

Figure 4:
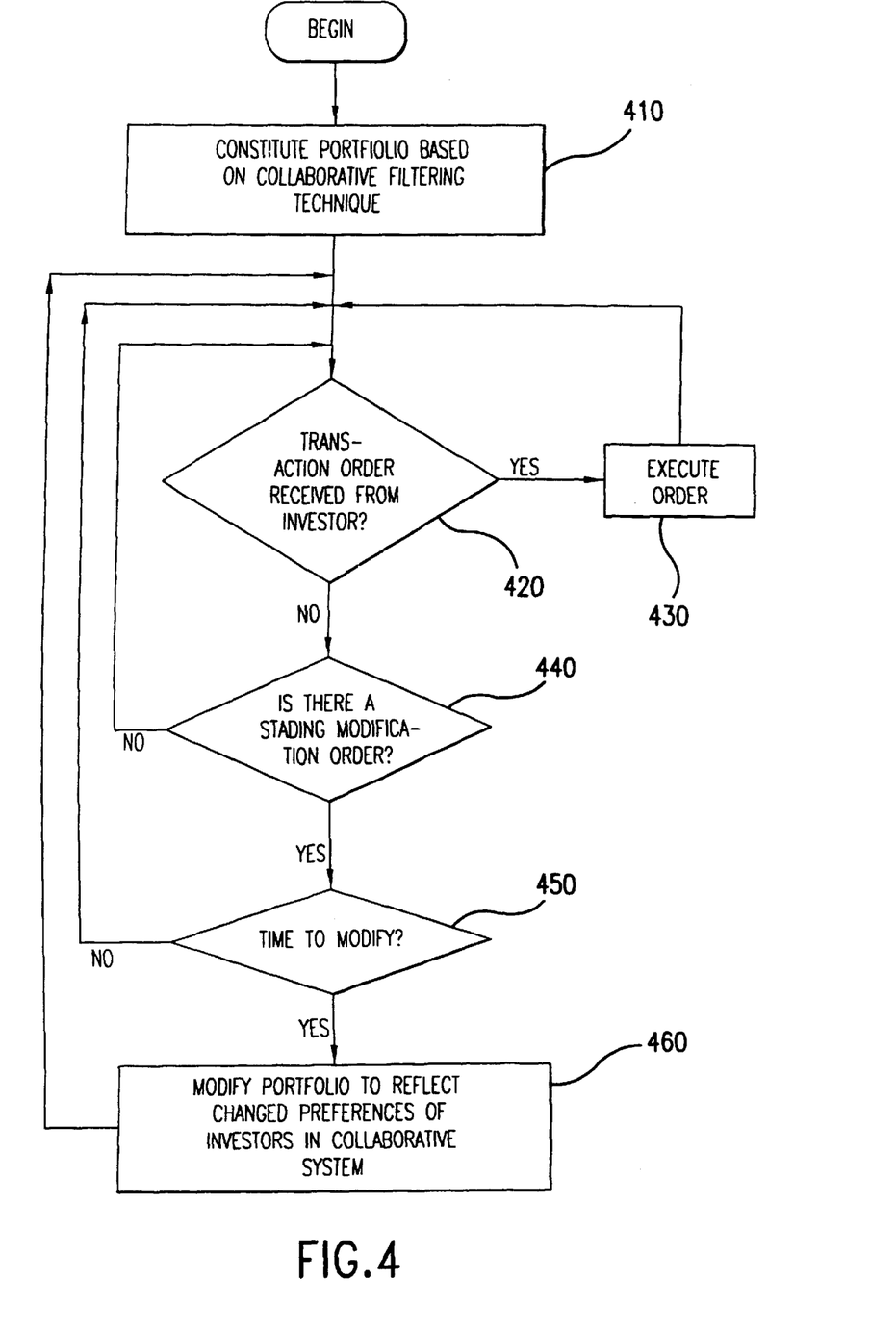
FIG. 4 illustrates a flow chart of a method according to an alternate embodiment of the present invention.

According to this alternate embodiment, an extension of the type of portfolio mechanism described in the related patent application is implemented. In this instance, a portfolio of securities is created that is directly owned by the investor, as opposed to the securities being held in a fund. This portfolio is constituted by using, as one of the criteria for selecting securities, the collaborative filtering technique described in the related application where the filter is basically all investors in the overall system. An investor would select a portfolio (at least as a starting point—the investor could later modify the portfolio) that was a portfolio that represented what all other investors in the system were investing in, and the weighting of those investments (see FIG. 4 at 410). The weighting of investments in the initial portfolio is determined based on the actual weighting as held by the aggregate of all the portfolios in the system. That portfolio could then be modified on a weekly or other basis, either at the option of the investor (see FIG. 4 at 420, 430), or pursuant to a standing instruction (see FIG. 4 at 440, 450) in a manner that would reflect the changing preferences of the investors in the system (see FIG. 4 at 460).

In this alternate embodiment, because of the number of changes and modifications to the portfolio on a frequent basis, the tax effects would potentially be overwhelming. Therefore, and notwithstanding the negative effects of holding a mutual fund (as described in the related application) as opposed to a direct portfolio holding, the preferred embodiment (described above) of holding through a mutual fund may have some benefits (primarily administrative) if an investor wished to follow this strategy.

Another aspect of the present invention is that a fund according to the invention generates information of various types. For example, the overall financial performance of the fund is one type of useful information that is generated. The aggregated, individual investment choices made by the members of the fund is another type of useful information that is generated. The generated information is itself a useful article of manufacture.

Still more useful information is generated when an affinity investing process is combined with the process as described above. This involves categorizing the investment decisions of the individual fund members to determine trends. Upon joining the fund (and subject to periodic updates) each fund member completes a form indicating certain information about him or herself (age, income, profession, gender, etc.), for the purpose of generating demographically specific statistics about the members' investment decisions. The resulting statistics constitute useful market information.

According to an alternate aspect of the invention, the individual investors in the fund are presented with an array of choices as to types of investments they wish to make, rather than specifying the specific securities to invest in. The types of investment are differentiated based on risk/reward or other characteristics. The fund administrator then selects specific securities, consistent with the types of investments chosen by the members, based on factors including minimizing of transaction costs via netting and aggregation. For example, instead of selecting particular stocks for the fund to invest in, the investor would select that the fund should have an investment in stocks that are riskier than the market by a factor of 20%. The fund would then acquire stocks, up to the dollar amount contributed by the investor, that satisfy this criteria.

Although the present invention has been described herein in terms of a preferred embodiment and several illustrative alternatives, those of ordinary skill in the art will understand that numerous modifications and variations may be made with respect to the described embodiments without departing from the scope of the invention. The scope of the invention is limited only by the appended claims.

What is claimed is:

1. A method of dynamically managing a mutual fund, the mutual fund having assets and liabilities that are collectively owned by plural members, the method comprising:

adjusting the assets and liabilities of the mutual fund in response to an action of one of the plural members;

determining pro rata ownership interest of said one of the plural members, based on the economic result of said action;

determining pro rata ownership interest of the remaining ones of the plural members, based on the economic result of said action; and repeating, as required by actions of any of the plural members, each of the preceding acts, so as to dynamically manage the mutual fund.

2. The method of claim 1, wherein adjusting the assets and liabilities of the mutual find is done based on the total value of the assets and liabilities of the mutual fund prior to the action, and the economic value of the action.

3. The method of claim 1, wherein determining pro rata ownership interest of any one of the plural members is done based on the pro rata ownership interest, prior to the action, if any, of such one of the plural members, the total value of the assets and liabilities of the mutual fund prior to the action, the action, if any taken by that member, and the total value of the assets and liabilities of the mutual fund after the action.

4. The method of claim 1, wherein said action is selected from the group consisting of: contributing cash to the mutual fund, withdrawing cash from the mutual fund, contributing investments to the mutual fund, withdrawing investments from the mutual fund, ordering that certain assets or liabilities currently held by the mutual fund be traded for certain other assets or liabilities not currently held by the mutual fund;

wherein investments is defined as being an interest selected from the group consisting of: equity securities, debt securities, foreign securities, domestic securities, options, warrants, bonds, notes, limited partnership interests, private placement securities, commodities, futures, bank loan syndication interests, global warming rights, air pollution rights, water pollution rights, insurance claim interests, tradable assets, tradable liabilities, and combinations thereof.

5. The method of claim 1, wherein adjusting the assets and liabilities of the mutual fund is done according to the formula $$T_{NEW} = T_{OLD} + V_{ACTION}$$

wherein $T_{NEW}$ corresponds to the total value of the assets and liabilities of the mutual fund after the action, $T_{OLD}$ corresponds to the total value of the assets and liabilities of the mutual fund prior to the action, and $V_{ACTION}$ corresponds to the economic value of the action.

6. The method of claim 5, wherein determining pro rata ownership interest of said one of the plural members is done according to the formula $$I_{NEW}(k) = (I_{OLD}(k) \cdot T_{OLD} + V_{ACTION}(k))/T_{NEW}$$

wherein $I_{NEW}(k)$ corresponds to the pro rata ownership interest, after the action, if any, of said one of the plural members, $V_{ACTION}(k)$ corresponds to the action, if any, of said one of the plural members, and $I_{OLD}(k)$ corresponds to the pro rata ownership interest, if any, prior to the action, of said one of the plural members, k being selected from the group of integers from 1 to N so as to uniquely correspond to said one of the plural members, where N is the number of plural members.

7. The method of claim 6, wherein the economic value of the action is based on the fair market value of assets and liabilities involved in the action at the time the action occurs.

8. The method of claim 1, wherein in the event that any one of the plural members acts to withdraw more cash from the mutual fund than the mutual fund is holding, the method further comprises:

selling investments held by the mutual fund so as to raise enough cash to complete the withdrawal.

9. The method of claim 8, wherein the act of selling investments is done via a rule selected from the group consisting of:

on a first-in-first-out basis, on a last-in-first-out basis on a pro rata basis, on a basis such that any investments that have not been added to for a substantial period of time are to be sold from first, a basis that minimizes the amount of any taxable gain, on a basis that achieves a selected or pre-determined tax effect, on a basis such that any investment that has a value as a percentage of the value of the fund that is less than a minimum threshold are to be sold from first, on a basis such that any investment that has a value as a percentage of the value of the fund that is more than a maximum threshold are to be sold from first, on a basis that a member designates one or more particular securities to be sold, and on a basis wherein the system keeps track of the investment selections that have been made by each of the plural members, and the past investment selections of the member withdrawing cash are sold to meet the mutual fund's cash-out needs.

10. The method of claim 1, wherein the act of repeating occurs at regular intervals and the act of adjusting is based on aggregated individual purchase and sales decisions of the plural members.

11. The method of claim 10, wherein when the acts of the method are repeated at regular intervals, any contradictory sales and purchase decisions by the plural members are mitigated so as to arrive at net amounts of each security that is to be bought or sold during the act of adjusting.

12. The method of claim 1, wherein the act of repeating occurs when accumulated purchase and sales decisions of the plural members, considered in the aggregate, trigger a predetermined threshold.

13. The method of claim 12, wherein said predetermined threshold is a threshold economic value of the assets and liabilities affected by the accumulated purchase and sales decisions.

14. The method of claim 12, wherein said predetermined threshold is a threshold volume of securities.

15. The method of claim 1, wherein actions of the fund members are transmitted via the Internet.

16. The method of claim 1, wherein the assets and liabilities of the fund include securities purchased via an initial public offering.

17. The method of claim 1, wherein each of the plural members is provided with information regarding financial performance of the fund.

18. The method of claim 1, wherein each of the plural members is provided with information regarding investment choices of others of the plural members.

19. The method of claim 1, wherein each of the plural members are permitted to make investments in the fund on the basis of automatic payments that are made to the fund on a substantially regular interval, along with a standing order for how the payments are to be allocated.

20. The method of claim 19, wherein the fund is a tax-deferred investment vehicle.

21. The method according to claim 1, further comprising the step of barring any investor from purchasing a security where an average daily trading volume is sufficiently low such that the investor's order would likely impact the price of those securities.

22. The method according to claim 1, further comprising the step of limiting in the aggregate the amount that an investor can contribute to the fund over a predetermined period.

23. The method according to claim 1, further comprising the step of limiting in the aggregate the amount that an investor can contribute to the fund relative to an overall size of the fund.

24. The method according to claim 1, further comprising the step of limiting each investor to no more than a predetermined number of trades over a set time period.

25. The method according to claim 1, further comprising the step of precluding any swap of securities not held for a predetermined minimum time period.

26. The method according to claim 1, further comprising the step of limiting the find's investment allocation to certain sectors or stocks that satisfy specified criteria as to liquidity or general popularity as determined by ADTV.

27. The method according to claim 1, further comprising the step of permitting each investor to allocate only from a number of selected stocks that have been chosen by a professional manager.

28. The method according to claim 1, further comprising the step of selecting investments in which the fund is to invest based on risk associated with the investment.

29. A process of calculating numeric results for use in dynamically managing a mutual fund, the mutual fund having assets and liabilities that are collectively owned by plural members, the method comprising:

calculating an adjustment of the assets and liabilities of the mutual fund in response to an action of one of the plural members, thereby producing a first numeric result;

calculating the pro rata ownership interest of said one of the plural members, based on the economic result of said action, thereby producing a second numeric result;

calculating the pro rata ownership interest of the remaining ones of the plural members, based on the economic result of said action, thereby producing a third numeric result; and repeating, as required by actions of any of the plural members, each of the preceding calculations, so as to enable dynamic management of the mutual fund.

30. The process of claim 29, wherein calculating an adjustment of the assets and liabilities of the mutual fund is done based on the total value of the assets and liabilities of the mutual fund prior to the action, and the economic value of the action.

31. The process of claim 29, wherein calculating the pro rata ownership interest of any one of the plural members is done based on the pro rata ownership interest, prior to the action, if any of said one of the plural members, the total value of the assets and liabilities of the mutual fund prior to the action, the action, if any taken by that member, and the total value of the assets and liabilities of the mutual fund after the action.

32. The process of claim 29, wherein calculating an adjustment of the assets and liabilities of the mutual fund is done according to the formula $$T_{NEW}=T_{OLD}+V_{ACTION}$$

wherein $T_{NEW}$ corresponds to the total value of the assets and liabilities of the mutual fund after the action, $T_{OLD}$ corresponds to the total value of the assets and liabilities of the mutual fund prior to the action, and $V_{ACTION}$ corresponds to the economic value of the action.

33. The process of claim 29, wherein calculating the pro rata ownership interest of any one of the plural members is done according to the formula $$I_{NEW}(k)=(I_{OLD}(k) \cdot T_{OLD}+V_{ACTION}(k))/T_{NEW}$$

wherein $I_{NEW}(k)$ corresponds to the pro rata ownership interest, after the action, of said one of the plural members, and $I_{OLD}(k)$ corresponds to the pro rata ownership interest, if any, prior to the action, of said one of the plural members, $V_{ACTION}(k)$ corresponds to the action, if any, of said one of the plural members, k being selected from the group of integers from 1 to N so as to uniquely correspond to said one of the plural members, where N is the number of plural members.

34. The process of claim 33, wherein the economic value of the action is based on the fair market value of assets and liabilities involved in the action at the time the action occurs.

35. The process of claim 29, wherein the process further comprises:

accumulating statistics regarding actions of the plural members over time so as to generate investment decision information; and categorizing said investment decision information based on demographic characteristics of the plural members so as to generate investment trend data.

36. A method of managing a portfolio of securities investments directly held by an owner-investor, the method comprising:

selecting the securities to be included in the portfolio, on a pro rata basis, according to the aggregated, individual investment choices of a group of system-investors; and modifying what securities are included in the portfolio so as to reflect changes in the aggregated, individual investment choices of said group of system-investors.

37. The method of claim 36, wherein the act of modifying what securities are included in the portfolio is done at the discretion of the owner-investor.

38. The method of claim 37, wherein the act of modifying what securities are included in the portfolio is done on a regular basis according to a standing instruction from the owner-investor.

39. A process for managing a mutual fund, the mutual fund having assets and liabilities that are collectively owned by plural members, the process comprising:

making a determination of assets and liabilities to be purchased and assets and liabilities to be sold, said determination being based on aggregated, individual purchase and sales decisions of said plural members;

executing purchases and sales of assets and liabilities according to said determination;

repeating the acts of making a determination and executing according to a predetermined rule.

40. The process for managing a mutual fund according to claim 39, wherein said predetermined rule is that repetition occurs at regular intervals.

41. The process for managing a mutual fund according to claim 40, wherein the act of making a determination includes mitigating contradictory sales and purchase decisions so as to arrive at net amounts of each security that is to be bought or sold during the act of executing.

42. The process for managing a mutual fund according to claim 39, wherein said predetermined rule is that repetition occurs when accumulated purchase and sales decisions of the plural members, considered in the aggregate, trigger a predetermined threshold.

43. The process for managing a mutual fund according to claim 42, wherein said predetermined threshold is a threshold economic value of the assets and liabilities affected by the accumulated purchase and sales decisions.

44. The process for managing a mutual fund according to claim 42, wherein said predetermined threshold is a threshold volume of securities.

45. The process for managing a mutual fund according to claim 42, wherein said predetermined rule is that repetition occurs dynamically as each individual one of said plural members makes an independent decision regarding purchase or sale of assets and liabilities by the fund.

46. The process for managing a mutual fund according to claim 42, wherein each of the plural members is free to contribute to said aggregated purchase and sales decisions independently of the remainder of the plural members.

47. The process for managing a mutual find according to claim 42, wherein the act of making a determination limits the effect of each individual decisions by one of the plural members to that member's respective ownership interest in the mutual fund.

48. A computer system adapted to dynamically manage a mutual fund, the mutual fund having assets and liabilities that are collectively owned by plural members, the computer system comprising:

a processor, and a memory including software instructions adapted to enable the computer system to perform:

adjusting the assets and liabilities of the mutual fund in response to an action of one of the plural members;

determining pro rata ownership interest of said one of the plural members, based on the economic result of said action;

determining pro rata ownership interest of the remaining ones of the plural members, based on the economic result of said action; and repeating, as required by actions of any of the plural members, each of the preceding acts, so as to dynamically manage the mutual fund.

49. The computer system of claim 48, wherein adjusting the assets and liabilities of the mutual fund is done based on the total value of the assets and liabilities of the mutual fund prior to the action, and the economic value of the action.

50. The computer system of claim 48, wherein determining pro rata ownership interest of said one of the plural members is done based on the pro rata ownership interest, prior to the action, if any, of said one of the plural members, the total value of the assets and liabilities of the mutual fund prior to the action, the action, if any taken by that member, and the total value of the assets and liabilities of the mutual fund after the action.

51. The computer system of claim 48, wherein said action is selected from the group consisting of: contributing cash to the mutual fund, withdrawing cash from the mutual fund, contributing investments to the mutual fund, withdrawing investments from the mutual fund, ordering that certain assets or liabilities currently held by the mutual fund be traded for certain other assets or liabilities not currently held by the mutual fund;

wherein investments is defined as being an interest selected from the group consisting of: equity securities, debt securities, foreign securities, domestic securities, options, warrants, bonds, notes, limited partnership interests, private placement securities, commodities, futures, bank loan syndication interests, global warming rights, air pollution rights, water pollution rights, insurance claim interests, tradable assets, tradable liabilities, and combinations thereof.

52. The computer system of claim 48, wherein adjusting the assets and liabilities of the mutual fund is done according to the formula $$T_{NEW} = T_{OLD} + V_{ACTION}$$

wherein $T_{NEW}$ corresponds to the total value of the assets and liabilities of the mutual fund after the action, $T_{OLD}$ corresponds to the total value of the assets and liabilities of the mutual fund prior to the action, and $V_{ACTION}$ corresponds to the economic value of the action.

53. The computer system of claim 52, wherein determining pro rata ownership interest of said one of the plural members is done according to the formula $$I_{NEW}(k) = (I_{OLD}(k) \cdot T_{OLD} + V_{ACTION})/T_{NEW}$$

wherein $I_{NEW}(k)$ corresponds to the pro rata ownership interest, after the action, of said one of the plural members, and $I_{OLD}(k)$ corresponds to the pro rata ownership interest, if any, prior to the action, of said one of the plural members, $V_{ACTION}(k)$ corresponds to the action, if any, of said one of the plural members, k being selected from the group of integers from 1 to N so as to uniquely correspond to said one of the plural members, where N is the number of plural members.

54. The computer system of claim 53, wherein the economic value of the action is based on the fair market value of assets and liabilities involved in the action at the time the action occurs.

55. The computer system of claim 48, wherein in the event that any one of the plural members acts to withdraw more cash from the mutual fund than the mutual fund is holding, the computer system is further enabled to perform:

selling investments held by the mutual find so as to raise enough cash to complete the withdrawal.

56. The computer system of claim 55, wherein the act of selling investments is done via a rule selected from the group consisting of:

on a first-in-first-out basis;

on a last-in-first-out basis; and a pro rata basis.

57. The computer system of claim 55, wherein the act of selling investments is done on a basis such that certain tax goals are achieved.

58. The computer system of claim 55, wherein the act of selling investments is done on a basis such that any investments that have not been added to for a substantial period of time are to be sold from first.

59. The computer system of claim 55, wherein the act of selling investments is done on a basis such that any investment that has a value as a percentage of the value of the fund that is less than a minimum threshold are to be sold from first.

60. The computer system of claim 55, wherein the act of selling investments is done on a basis such that any investment that has a value as a percentage of the value of the fund that is more than a maximum threshold are to be sold from first.

61. The computer system of claim 55, wherein the act of selling investments is done on a basis that a member designates one or more particular securities to be sold.

62. The computer system of claim 55, wherein the act of selling investments is done on a basis wherein the system keeps track of the investment selections that have been made by each of the plural members, and the past investment selections of the member withdrawing cash are sold to meet the mutual fund's cash-out needs.

63. The computer system of claim 55, wherein the act of repeating occurs at regular intervals and the act of adjusting is based on aggregated, individual purchase and sales decisions of the plural members.

64. The computer system of claim 63, wherein when the acts of the method are repeated at regular intervals, any contradictory sales and purchase decisions by the plural members are mitigated so as to arrive at net amounts of each security that is to be bought or sold during the act of adjusting.

65. The computer system of claim 64, wherein the act of repeating occurs when accumulated purchase and sales decisions of the plural members, considered in the aggregate, trigger a predetermined threshold.

66. The computer system of claim 64, wherein said predetermined threshold is a threshold economic value of the assets and liabilities affected by the accumulated purchase and sales decisions.

67. The computer system of claim 64, wherein said predetermined threshold is a threshold volume of securities.

68. The computer system of claim 48, wherein actions of the fund members are transmitted via the Internet.

69. The computer system of claim 48, wherein the assets and liabilities of the fund include securities purchased via an initial public offering.

70. The computer system of claim 48, wherein each of the plural members is provided with information regarding financial performance of the fund.

71. The computer system of claim 48, wherein each of the plural members is provided with information regarding investment choices of others of the plural members.

72. The computer system of claim 48, wherein each of the plural members are permitted to make investments in the fund on the basis of automatic payments that are made to the fund on a substantially regular interval, along with a standing order for how the payments are to be allocated.

73. The computer system of claim 49, wherein the fund is a tax-deferred investment vehicle.

74. A computer system adapted to manage a portfolio of securities investments directly held by an owner-investor, comprising:
    a processor, and
    a memory including software instructions adapted to enable the computer system to perform:
        selecting the securities to be included in the portfolio, on a pro rata basis, according to the aggregate investment choices of a group of system-investors; and
        modifying what securities are included in the portfolio so as to reflect changes in the aggregate investment choices of said group of system-investors.

75. The computer system of claim 74, wherein the act of modifying what securities are included in the portfolio is done at the discretion of the owner-investor.

76. The computer system of claim 74, wherein the act of modifying what securities are included in the portfolio is done on a regular basis according to a standing instruction from the owner-investor.

77. A computer program product for enabling a computer to dynamically manage a mutual fund, the mutual fund having assets and liabilities that are collectively owned by plural members, the computer program product comprising:
    software instructions for enabling the computer to perform predetermined operations, and
    a computer readable medium embodying the software instructions;
    the predetermined operations comprising:
        adjusting the assets and liabilities of the mutual fund in response to an action of one of the plural members;
        determining pro rata ownership interest of said one of the plural members, based on the economic result of said action;
        determining pro rata ownership interest of the remaining ones of the plural members, based on the economic result of said action; and
        repeating, as required by actions of any of the plural members, each of the preceding acts, so as to dynamically manage the mutual fund.

78. A computer program product for enabling a computer to manage a portfolio of securities investments directly held by an owner-investor, the computer program product comprising:
    software instructions for enabling the computer to perform predetermined operations, and
    a computer readable medium embodying the software instructions;
    the predetermined operations comprising:
        selecting the securities to be included in the portfolio, on a pro rata basis, according to the aggregate investment choices of a group of system-investors; and
        modifying what securities are included in the portfolio so as to reflect changes in the aggregate investment choices of said group of system-investors.

79. A computer system adapted to dynamically manage a mutual fund, the mutual fund having assets and liabilities that are collectively owned by plural members, the computer system comprising:
    an input/output portion manipulating the assets and liabilities of the mutual fund in response to an action of one of the plural members;
    an arithmetic logic unit determining pro rata ownership interest of said one of the plural members, based on the economic result of said action, and for determining pro rata ownership interest of the remaining ones of the plural members, based on the economic result of said action; and
    a processor controlling said input/output portion and said arithmetic logic unit to repeat their respective functions, as required by actions of any of the plural members, so as to dynamically manage the mutual fund.

80. A computer system adapted to manage a portfolio of securities investments directly held by an owner-investor, comprising:
    a processor selecting the securities to be included in the portfolio, on a pro rata basis, according to the aggregate investment choices of a group of system-investors; and
    an input/output portion modifying what securities are included in the portfolio so as to reflect changes in the aggregate investment choices of said group of system-investors.

81. An apparatus for dynamically managing a mutual fund, the mutual fund having assets and liabilities that are collectively owned by plural members, the apparatus comprising:
    means for adjusting the assets and liabilities of the mutual fund in response to an action of one of the plural members;
    means for determining pro rata ownership interest of said one of the plural members, based on the economic result of said action;
    means for determining pro rata ownership interest of the remaining ones of the plural members, based on the economic result of said action; and
    means for causing repeated operation, as required by actions of any of the plural members, each of said means for adjusting, said means for determining pro rata ownership interest of said one of the plural members, and said means for determining pro rata ownership interest of the remaining ones of the plural members;
    whereby the mutual fund is dynamically managed.

82. An apparatus for managing a portfolio of securities investments directly held by an owner-investor, the apparatus comprising:
    means for selecting the securities to be included in the portfolio, on a pro rata basis, according to the aggregate investment choices of a group of system-investors; and means for modifying what securities are included in the portfolio so as to reflect changes in the aggregate investment choices of said group of system-investors.

83. An investment fund comprising:
assets and liabilities that are collectively owned by plural investors, the assets and liabilities comprising: cash and investments;
a computer system adapted to dynamically manage said assets and liabilities, computer system comprising:
a processor, and
a memory including software instructions adapted to enable the computer system to perform:
adjusting the assets and liabilities of the mutual fund in response to an action of one of the plural members;
determining pro rata ownership interest of said one of the plural members, based on the economic result of said action;
determining pro rata ownership interest of the remaining ones of the plural members, based on the economic result of said action; and
repeating, as required by actions of any of the plural members, each of the preceding acts, so as to dynamically manage the mutual fund.

84. The investment fund of claim 83, wherein adjusting the assets and liabilities of the mutual fund is done based on the total value of the assets and liabilities of the mutual fund prior to the action, and the economic value of the action.

85. The investment fund of claim 83, wherein determining pro rata ownership interest of said one of the plural members is done based on the pro rata ownership interest, if any, prior to the action, if any, of said one of the plural members, the total value of the assets and liabilities of the mutual fund prior to the action, and the total value of the assets and liabilities of the mutual fund after the action.

86. The investment fund of claim 83, wherein said action is selected from the group consisting of: contributing cash to the mutual fund, withdrawing cash from the mutual fund, contributing investments to the mutual fund, withdrawing investments from the mutual fund, ordering that certain assets or liabilities currently held by the mutual fund be traded for certain other assets or liabilities not currently held by the mutual fund;
wherein investments is defined as being an interest selected from the group consisting of: equity securities, debt securities, foreign securities, domestic securities, options, warrants, bonds, notes, limited partnership interests, private placement securities, commodities, futures, bank loan syndication interests, global warming rights, air pollution rights, water pollution rights, insurance claim interests, tradable assets, tradable liabilities, and combinations thereof.

87. The investment fund of claim 83, wherein adjusting the assets and liabilities of the mutual find is done according to the formula $$T_{NEW}=T_{OLD}+V_{ACTION}$$

wherein $T_{NEW}$ corresponds to the total value of the assets and liabilities of the mutual fund after the action, $T_{OLD}$ corresponds to the total value of the assets and liabilities of the mutual fund prior to the action, and $V_{ACTION}$ corresponds to the economic value of the action.

88. The investment fund of claim 87, wherein determining pro rata ownership interest of said one of the plural members is done according to the formula $$I_{NEW}(k)=(I_{OLD}(k) \cdot T_{OLD}+V_{ACTION}(k))/T_{NEW}$$

wherein $I_{NEW}$ (k) corresponds to the pro rata ownership interest, after the action, of said one of the plural members, and $I_{OLD}$ (k) corresponds to the pro rata ownership interest, if any, prior to the action, of said one of the plural members, $V_{ACTION}$ (k) corresponds to the action, if any, of said one of the plural members, k being selected from the group of integers from 1 to N so as to uniquely correspond to said one of the plural members, where N is the number of plural members.

89. The investment fund of claim 88, wherein the economic value of the action is based on the fair market value of assets and liabilities involved in the action at the time the action occurs.

90. The investment fund of claim 86, wherein in the event that any one of the plural members acts to withdraw more cash from the mutual fund than the mutual fund is holding, the computer system is further enabled to perform:
selling investments held by the mutual fund so as to raise enough cash to complete the withdrawal.

91. The investment fund of claim 90, wherein the act of selling investments is done via a rule selected from the group consisting of:
on a first-in-first-out basis,
on a last-in-first-out basis
on a pro rata basis,
on a basis such that any investments that have not been added to for a substantial period of time are to be sold from first,
on a basis that minimizes the amount of any taxable gain,
on a basis that achieves a selected or pre-determined tax effect,
on a basis such that any investment that has a value as a percentage of the value of the fund that is less than a minimum threshold are to be sold from first,
on a basis such that any investment that has a value as a percentage of the value of the fund that is more than a maximum threshold are to be sold from first,
on a basis that a member designates one or more particular securities to be sold, and
on a basis wherein the system keeps track of the investment selections that have been made by each of the plural members, and the past investment selections of the member withdrawing cash are sold to meet the mutual fund's cash-out needs.

92. The investment fund of claim 91, wherein the act of repeating occurs at regular intervals and the act of adjusting is based on aggregated purchase and sales decisions of the plural members.

93. The investment fund of claim 92, wherein when the acts of the method are repeated at regular intervals, any contradictory sales and purchase decisions by the plural members are mitigated so as to arrive at net amounts of each security that is to be bought or sold during the act of adjusting.

94. The investment fund of claim 83, wherein the act of repeating occurs when accumulated purchase and sales decisions of the plural members, considered in the aggregate, trigger a predetermined threshold.

95. The investment fund of claim 94, wherein said predetermined threshold is a threshold economic value of the assets and liabilities affected by the accumulated purchase and sales decisions.

96. The investment fund of claim 94, wherein said predetermined threshold is a threshold volume of securities.

97. An investment fund comprising:
   assets and liabilities that are collectively owned by plural investors, the assets and liabilities comprising: cash and investments;
   a computer system adapted to dynamically manage said assets and liabilities, computer system comprising:
      a processor, and
      a memory including software instructions adapted to enable the computer system to perform:
         adjusting the assets and liabilities of the mutual fund in response to an action of one of the plural members;
         determining pro rata ownership interest of said one of the plural members, based on the economic result of said action;
         determining pro rata ownership interest of the remaining ones of the plural members, based on the economic result of said action; and
         repeating, as required by actions of any of the plural members, each of the preceding acts, so as to dynamically manage the mutual fund;
   wherein said action is selected from the group consisting of: contributing cash to the mutual fund, withdrawing cash from the mutual fund, contributing investments to the mutual fund, withdrawing investments from the mutual fund, ordering that certain assets or liabilities currently held by the mutual fund be traded for certain other assets or liabilities not currently held by the mutual fund;
   wherein investments is defined as being an interest selected from the group consisting of: equity securities, debt securities, foreign securities, domestic securities, options, warrants, bonds, notes, limited partnership interests, private placement securities, commodities, futures, bank loan syndication interests, global warming rights, air pollution rights, water pollution rights, insurance claim interests, tradable assets, tradable liabilities, and combinations thereof;
   wherein the economic value of the action is based on the fair market value of assets and liabilities involved in the action at the time the action occurs;
   wherein the act of repeating occurs at regular intervals and the act of adjusting is based on aggregated purchase and sales decisions of the plural members; and
   wherein, when the acts of the method are repeated at regular intervals, any contradictory sales and purchase decisions by the plural members are mitigated so as to arrive at net amounts of each security that is to be bought or sold during the act of adjusting.

* * * * *

UNITED STATES PATENT AND TRADEMARK OFFICE
CERTIFICATE OF CORRECTION

PATENT NO.   : 6,338,047 B1                                                                    Page 1 of 1
DATED        : January 8, 2002
INVENTOR(S)  : Steven M.H. Wallman It is certified that error appears in the above-identified patent and that said Letters Patent is hereby corrected as shown below:

Column 3
Line 51, change "find" to -- fund --.

Column 4,
Line 19, change "fund ," to -- fund, --.

Column 8,
Line 4, change "equivalent potentially" to -- equivalent - potentially --.

Column 10,
Line 27, change "12" to -- 12 --.
Line 28, change "14" to -- 14 --.

Column 12,
Line 54, change "find" to -- fund --.

Column 16,
Line 66, change "find" to -- fund --.

Column 18,
Line 16, change "find" to -- fund --.

Signed and Sealed this

Twenty-fifth Day of June, 2002

*Attest:*

*Attesting Officer*

JAMES E. ROGAN
*Director of the United States Patent and Trademark Office*